United States Patent
Yan et al.

(10) Patent No.: US 10,106,651 B2
(45) Date of Patent: Oct. 23, 2018

(54) PEEK/NANO-HA COMPOSITES FOR SLS AND PREPARATION METHODS THEREOF

(71) Applicant: GUANGDONG SILVER AGE SCI & TECH CO., LTD, Dongguan, Guangdong (CN)

(72) Inventors: Chunze Yan, Hubei (CN); Yusheng Shi, Hubei (CN); Yi Fu, Hubei (CN); Yunsong Shi, Hubei (CN); Teng Pan, Hubei (CN); Yan Wang, Hubei (CN); Qingsong Wei, Hubei (CN); Jie Liu, Hubei (CN)

( * ) Notice: Subject to any disclaimer, the term of this patent is extended or adjusted under 35 U.S.C. 154(b) by 0 days.

(21) Appl. No.: 15/887,486

(22) Filed: Feb. 2, 2018

(65) Prior Publication Data

US 2018/0155496 A1 Jun. 7, 2018

Related U.S. Application Data

(63) Continuation of application No. PCT/CN2015/091159, filed on Sep. 30, 2015.

(30) Foreign Application Priority Data

Sep. 2, 2015 (CN) .......................... 2015 1 0558005

(51) Int. Cl.
*A61F 2/00* (2006.01)
*C08G 65/40* (2006.01)
(Continued)

(52) U.S. Cl.
CPC ........ *C08G 65/4012* (2013.01); *B22F 3/1055* (2013.01); *B29B 13/06* (2013.01);
(Continued)

(58) Field of Classification Search
CPC ................ C08G 65/4012; C08G 65/46; C08G 2650/40; C08K 3/32; C08K 2003/325;
(Continued)

(56) References Cited

U.S. PATENT DOCUMENTS

| | | | |
|---|---|---|---|
| 4,699,742 A * | 10/1987 | Nakamura | ............ C04B 35/447 264/311 |
| 5,872,159 A | 2/1999 | Cougoulic | |
| 2005/0158535 A1 * | 7/2005 | Zhang | ..................... A61L 27/46 428/304.4 |

FOREIGN PATENT DOCUMENTS

| | | |
|---|---|---|
| CN | 1505532 A | 6/2004 |
| CN | 100360193 C | 1/2008 |

(Continued)

*Primary Examiner* — Shane Fang
(74) *Attorney, Agent, or Firm* — Wayne & Ken, LLC; Tony Hom

(57) ABSTRACT

The present invention discloses polyetheretherketone/nano-hydroxyapatite (PEEK/NANO-HA) composites for selective laser sintering (SLS), and a preparation method thereof. The method for preparing the composites comprises steps of: selecting PEEK having a particle size of 10-100 μm, and an aqueous solution of reaction precursor 1 and an aqueous solution of reaction precursor 2, uniformly dispersing the PEEK in the aqueous solution of reaction precursor 1, adding the aqueous solution of reaction precursor 2 drop-wise in the mixed solution of the aqueous solution of reaction precursor 1 and the PEEK while stirring to adjust pH of the mixed solution to 10-12, and continuously reacting or 24-48 hours. The composites obtained by the preparation method of the present invention have the advantages of good biocompatibility, homogeneous morphology and good fluidity, and are advantageous to the powdering and shaping process during SLS.

4 Claims, 4 Drawing Sheets

(51) Int. Cl.
  *C08K 3/32* (2006.01)
  *C08L 61/16* (2006.01)
  *B29C 64/153* (2017.01)
  *B22F 3/105* (2006.01)
  *B29B 13/06* (2006.01)
  *B29B 13/10* (2006.01)
  *C08G 65/46* (2006.01)
  *B29K 71/00* (2006.01)

(52) U.S. Cl.
  CPC ............ *B29B 13/10* (2013.01); *B29C 64/153* (2017.08); *C08G 65/46* (2013.01); *C08K 3/32* (2013.01); *C08L 61/16* (2013.01); *B29K 2071/00* (2013.01); *C08G 2650/40* (2013.01); *C08K 2003/325* (2013.01); *C08K 2201/005* (2013.01)

(58) Field of Classification Search
  CPC . C08K 2201/005; B29C 64/153; B29B 13/06; B29B 13/10; B22F 3/1055; B29K 2071/00; A61F 2/02; A61C 13/00; B28B 3/20
  See application file for complete search history.

(56) References Cited

FOREIGN PATENT DOCUMENTS

| | | |
|---|---|---|
| CN | 101148540 A | 3/2008 |
| CN | 101148541 A | 3/2008 |
| CN | 101584886 A | 11/2009 |
| CN | 101899193 A | 12/2010 |
| CN | 102028971 A | 4/2011 |
| CN | 102058906 A | 5/2011 |
| CN | 103554531 A | 2/2014 |
| CN | 104140668 A | 11/2014 |
| CN | 104307037 A | 1/2015 |
| CN | 105061989 A | 11/2015 |
| WO | 2004058319 A1 | 7/2004 |

* cited by examiner

Energy (keV)

Energy (keV)

PEEK/NANO-HA COMPOSITES FOR SLS AND PREPARATION METHODS THEREOF

TECHNICAL FIELD

The present invention belongs to the field of advanced manufacturing techniques and material preparation, and particularly, relates to PEEK/NANO-HA composites for SLS and preparation methods thereof.

BACKGROUND OF THE PRESENT INVENTION

Selective laser sintering (SLS) is an important branch of additive manufacturing techniques, in which, on the basis of concepts of dispersing and accumulated forming, a solid model is formed by selectively scanning and sintering powdery material by laser, laminated manufacturing and superposition layer by layer. SLS is different from the conventional processes such as dislodge forming, splice forming and forced forming, where models and functional parts of high polymer material, ceramic material, metal material and various composites are processed by accumulation of material. Independent of the complexity of formed parts, SLS has been widely applied in the biomedical field. By SLS, personalized and complex medical products can be produced most efficiently to maximally match the needs of patients.

As a wholly aromatic semi-crystalline polymer, PEEK has the advantages of good mechanical performance and excellent radiation resistance and insulation. In many special fields, PEEK can be used to replace conventional material, for example, metal material and ceramic material. With the use of PEEK, the weight is reduced without influencing the performance in use. In the field of medical instruments, PEEK is increasingly applied in clinical practices of medical products for spinal surgeries, injuries and orthopedic treatments. Compared with other implants, PEEK has good biocompatibility and adjustable mechanical property, and is invisible in CT and MRI. However, the application of PEEK in the chemical field is restricted due to the lack of bioactivity. As a main component of bones and teeth of vertebrates, the content of HA is 96 wt % in human tooth enamel and 69 wt.% in human bones. Compared with the conventional bone-substitute material, for example, stainless steel, titanium alloy and ceramic material, HA has excellent osteoinduction and is thus highly conducive for the adhesion and growth of bone cells on its surface. Therefore, HA has been widely applied in bone tissue engineering. By the release of calcium ions and phosphate ions, closed bonding can be formed between the implanted HA and tissues, with new tissues gown there. In this way, the implant is bonded with the bones. HA will be more bioactive at a finer grain size. The combination of NANO-HA and PEEK can significantly improve the bioactivity of PEEK while ensuring enough intensity, and thus has great value for clinic use and broad market prospect.

At present, there are main four methods for preparing powdery composites for SLS, i.e., mechanical mixing, twin-screw extrusion and freeze grinding, solvent mixing and solvent precipitation. However, all the four preparation methods have obvious disadvantages in the preparation of powdery PEEK/NANO-HA composites for SLS, specifically:

(1) Mechanical mixing means that two kinds of powder are mixed by a mechanical mixing device. This method is simple in operation. However, by this method, it is unable to uniformly disperse nano-fillers in the high polymer substrate at a nanometer level.

(2) Twin-screw extrusion and freeze grinding means that two kinds of material are molten, blended, extruded and granulated by a twin-screw extruder, and then by freeze grinded to prepare powder for SLS. By this method, two kinds of material can be uniformly mixed. However, since PEEK has high intensity and toughness, it is unable to produce PEEK into powder, having a small particle size of 10-100 μm, for SLS by freeze grinding, and the powdery particles are highly irregular in shape with poor fluidity.

(3) Solvent mixing usually requires some organic solvents which are harmful to the environment and human beings. The residual solvents will have adverse effect on the biocompatibility of the composites. In addition, the dispersion of NANO-HA in the organic solvents is usually realized in aid of surfactants. The residual surfactants will degrade the biocompatibility of the composites. For example, N,N'-dimethylformamide (solvent) was used in the preparation of PEEK/NANO-HA composites for SLS, by Fuhua, et al.

(4) Solvent precipitation is generally applicable to the preparation of powdery nylon composites. For example, in patent ZL200710053668.2, inorganic nano-filler reinforced nylon composites for SLS were prepared by solvent precipitation; and in patent ZL200710053667.8, clay-reinforced nylon composites for SLS were prepared by solvent precipitation. Since PEEK is quite resistant to solvents, this method is not applicable to the preparation of powdery PEEK composites.

SUMMARY OF THE PRESENT INVENTION

In view of the defects in the prior art, the present invention provides PEEK/NANO-HA composites for SLS and a preparation method thereof. In the present invention, in an aqueous solution, NANO-HA is uniformly dispersed in the high polymer substrate by an in-situ composite method. The technical problems of poor fluidity, inhomogeneous morphology and low biocompatibility of the existing PEEK/NANO-HA composites for SLS are solved.

For this purpose, according to one aspect of the present invention, a method for preparing PEEK/NANO-HA composites for SLS is provided, comprising steps of: (1) selecting PEEK having a particle size of 10-100 μm;

(2) adding the powdery PEEK in the step (1) to an aqueous solution of reaction precursor 1 so that the PEEK is uniformly dispersed in the aqueous solution;

(3) stirring the mixed solution obtained in the step (2), adding an aqueous solution of reaction precursor 2 dropwise in the mixed solution to adjust pH to 10-12, and reacting for 24-48 hours while stirring; and (4) at last, vacuum filtering the mixed solution, and washing, drying and grinding the filter cake to eventually obtain the PEEK/NANO-HA composites, wherein the reaction precursor 1 is a precursor solution containing calcium ions, the reaction precursor 2 is a precursor solution containing phosphate ions, and the reaction precursor 1 and the reaction precursor 2 are dosed such that the mole ratio of Ca/P is 1.67-2.0.

Preferably, in the step (1), the PEEK has a particle size of 20-70 μm.

Preferably, the concentration of the aqueous solution of reaction precursor 1 is 0.5-1.0 mol/L, and the concentration of the aqueous solution of reaction precursor 2 is 1.0-2.0 mol/L.

Preferably, the reaction precursor 1 is Ca(OH)$_2$ or Ca(NO$_3$)$_2$, and the reaction precursor 2 is H$_3$PO$_4$ or (NH$_4$)$_2$HPO$_4$.

Preferably, in the step (2), the reaction precursor 1 is Ca(OH)$_2$, and in the step (3), the reaction precursor 2 is H$_3$PO$_4$.

Preferably, in the step (2), the reaction precursor 1 is Ca(NO$_3$)$_2$.4H$_2$O, and in the step (3), the reaction precursor 2 is (NH$_4$)$_2$HPO$_4$.

The present invention further provides PEEK/NANO-HA composites prepared by the preparation method. Wherein, the composites are powdery.

Preferably, the content of NANO-HA in the composites is 10-50 wt %.

Generally, compared with the prior art, the above technical solutions of the present invention have the following beneficial effects.

(1) In the present invention, HA is uniformly dispersed in the high polymer substrate (PEEK) by an in-situ composite method, so that good interface bonding is formed. The prepared PEEK/NANO-HA composites have the advantages of homogeneous morphology, high degree of sphericity and good fluidity, and are quite applicable to the formation of personalized bone transplantation prostheses by SLS.

(2) In the preparation method of the present invention, the use of water as the reaction medium is not harmful to the environment and human beings. No other substance that may degrade the biocompatibility of the composites is introduced in the preparation method, so that the toxicity of the composites is greatly decreased.

(3) By the design of various parameters and components in the preparation method, such as the particle size of powder, the selection of reaction precursors, and further research on parameters such as the ratio of Ca/P, the prepared composites are more advantageous to the powdering and shaping process during SLS.

DETAILED DESCRIPTION OF THE PRESENT INVENTION

Figure 1A:
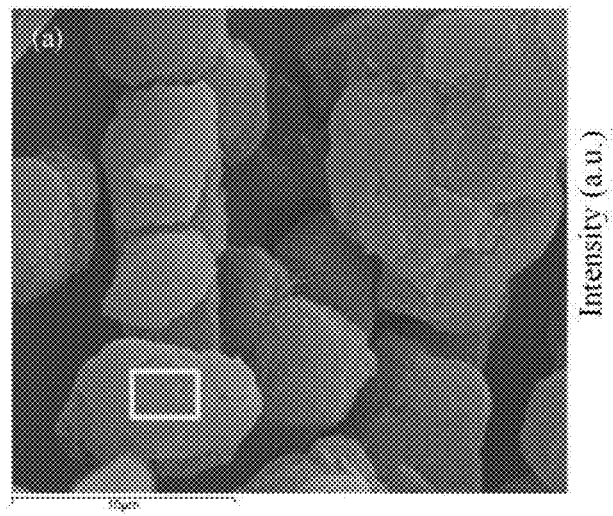
FIG. 1(a) is a micrograph of pure PEEK powder.

To make the objectives, technical solutions and advantages of the present invention clearer, the present invention will be further described in detail as below with reference to the accompanying drawings by embodiments. It should be understood that specific embodiments described here are merely used for explaining but not limiting the present invention. In addition, technical features in various implementations of the present invention to be described below can be combined if not conflicted.

The method for preparing polyetheretherketone/nano-hydroxyapatite (PEEK/NANO-HA) composites for selective laser sintering (SLS) of the present invention uses a method for in-situ recombination in an aqueous solution and specifically comprises steps of:

(1) selecting PEEK having a particle size of 10-100 μm;

(2) adding the PEEK selected in the step (1) to an aqueous solution of reaction precursor 1, and ultrasonically treating for 30-60 min so that the PEEK is uniformly dispersed in the aqueous solution, wherein the reaction precursor 1 is a precursor solution containing calcium ions, preferably Ca(OH)$_2$ or Ca(NO$_3$)$_2$.4H$_2$O, and the concentration of the aqueous solution of reaction precursor 1 is 0.5-1.0 mol/L;

(3) stirring intensely the mixed solution obtained in the step (2), slowly adding an aqueous solution of reaction precursor 2 dropwise in the mixed solution, and adjusting pH of the mixed solution to 10-12 by a pH regulator, and continuously reacting the mixed solution in an alkaline environment for 24-48 hours while intensely stirring, wherein the reaction precursor 2 is a precursor solution containing phosphate ions, preferably H$_3$PO$_4$ or (NH$_4$)$_2$PO$_4$, the concentration of the aqueous solution of reaction precursor 2 is 1.0-2.0 mol/L, and the reaction precursor 1 and the reaction precursor 2 are dosed such that the mole ratio of Ca/P is 1.67-2.0; and (4) at last, vacuum filtering the mixed reaction solution, washing with distilled water, and vacuum drying and grinding the filter cake to eventually obtain the PEEK/NANO-HA composites.

In the step (1), the PEEK preferably has a particle size of 20-70 μm. The preferred range of the particle size is mainly advantageous for the SLS. If the particle size is too large, the SLS formed part has a low precision and a rough surface; however, if the particle size is too small, it is likely to result in agglomeration which is disadvantageous for powdering and thus result in deficiency of the SLS formed part.

If the reaction precursor 1 is Ca(OH)$_2$, the reaction precursor 2 is preferably H$_3$PO$_4$. Ca(OH)$_2$ and H$_3$PO$_4$ are dosed such that the mole ratio of Ca/P is 1.67. The reaction formula is as follows:

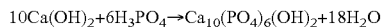

If the reaction precursor 1 is Ca(NO$_3$)$_2$.4H$_2$O, the reaction precursor 2 is preferably (NH$_4$)$_2$HPO$_4$. Ca(NO$_3$)$_2$.4H$_2$O and (NH$_4$)$_2$HPO$_4$ are dosed such that the mole ratio of Ca/P is 1.67. The reaction formula is as follows:

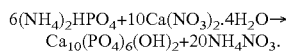

In the step (3), the pH regulator can be a common regulator in the art, preferably 10% ammonium hydroxide solution. In the step (3), the aqueous solution of reaction precursor 2 is slowly added dropwise at 1-20 mL/min.

The present invention provides PEEK/NANO-HA composites for selective laser sintering (SLS), wherein NANO-HA is uniformly dispersed in PEEK. The composites are powdery, uniform in particle size and high in degree of sphericity. Individualized and complex bone transplantation prostheses are manufactured by selective laser sintering. The content of NANO-HA in the composites is 10-50 wt %. The NANO-HA in the composites of the present invention look like needles and have a width of 20-30 nm and a length of about 100-150 nm.

The embodiments will be described below.

Embodiment 1

(1) PEEK powdery material having a particle size of 20-70 μm was selected.

(2) 500 g of PEEK powder selected in the step (1) was added in 1.11L of 0.5 mol/L aqueous solution of Ca(OH)$_2$ and then ultrasonically treated for 60 min so that the PEEK powder was uniformly dispersed in the aqueous solution.

(3) The mixed solution obtained in the step (2) was stirred intensely, 333 mL of 1.0 mol/L aqueous solution of $H_3PO_4$ was slowly added in the mixed solution dropwise at 10 ml/min, and the pH of the mixed solution was adjusted to 10 with 10% ammonium hydroxide solution; and, the mixed solution was continuously reacted in an alkaline environment for 24 hours while intensely stirring.

(4) At last, the mixed reaction solution was vacuum filtered, and the obtained powder aggregation was washed with distilled water, vacuum dried and grinded to eventually obtain the powdery PEEK/NANO-HA composites having a NANO-HA content of 10 wt %.

Embodiment 2

(1) PEEK powdery material having a particle size of 20-70 μm was selected.

(2) 500 g of PEEK powder selected in the step (1) was added in 2.49L of 0.5 mol/L aqueous solution of $Ca(OH)_2$ and then ultrasonically treated for 30 min so that the PEEK powder was uniformly dispersed in the aqueous solution.

(3) The mixed solution obtained in the step (2) was stirred intensely, 747 mL of 1.0 mol/L aqueous solution of $H_3PO_4$ was slowly added in the mixed solution dropwise at 10 mL/min, and the pH of the mixed solution was adjusted to 10 with 10% ammonium hydroxide solution; and, the mixed solution was continuously reacted in an alkaline environment for 24 hours while intensely stirring.

(4) At last, the mixed reaction solution was vacuum filtered, and the obtained powder aggregation was washed with distilled water, vacuum dried and grinded to eventually obtain the powdery PEEK/NANO-HA composites having a NANO-HA content of 20 wt %.

Embodiment 3

(1) PEEK powdery material having a particle size of 20-70 μm was selected.

(2) 500 g of PEEK powder selected in the step (1) was added in 4.98L of 1.0 mol/L aqueous solution of $Ca(OH)_2$ and then ultrasonically treated for 60 min so that the PEEK powder was uniformly dispersed in the aqueous solution.

(3) The mixed solution obtained in the step (2) was stirred intensely, 1.5L of 2.0 mol/L aqueous solution of $H_3PO_4$ was slowly added in the mixed solution dropwise at 20 mL/min, and the pH of the mixed solution was adjusted to 10 with 10% ammonium hydroxide solution; and, the mixed solution was continuously reacted in an alkaline environment for 48 hours while intensely stirring.

(4) At last, the mixed reaction solution was vacuum filtered, and the obtained powder aggregation was washed with distilled water, vacuum dried and grinded to eventually obtain the powdery PEEK/NANO-HA composites having a NANO-HA content of 50 wt %.

Embodiment 4

(1) PEEK powdery material having a particle size of 20-70 μm was selected.

(2) 500 g of PEEK powder selected in the step (1) was added in 4.98L of 1.0 mol/L aqueous solution of $Ca(NO_3)_2 \cdot 4H_2O$ and then ultrasonically treated for 60 min so that the PEEK powder was uniformly dispersed in the aqueous solution.

(3) The mixed solution obtained in the step (2) was stirred intensely, 1.5L of 2.0 mol/L aqueous solution of $(NH_4)_2HPO_4$ was slowly added in the mixed solution dropwise at 20 mL/min, and the pH of the mixed solution was adjusted to 10 with 10% ammonium hydroxide solution; and, the mixed solution was continuously reacted in an alkaline environment for 48 hours while intensely stirring.

(4) At last, the mixed reaction solution was vacuum filtered, and the obtained powder aggregation was washed with distilled water, vacuum dried and grinded to eventually obtain the powdery PEEK/NANO-HA composites having a NANO-HA content of 50 wt %.

Embodiment 5

(1) PEEK powdery material having a particle size of 20-70 μm was selected.

(2) 500 g of PEEK powder selected in the step (1) was added in 2.49L of 0.5 mol/L aqueous solution of $Ca(NO_3)_2 \cdot 4H_2O$ and then ultrasonically treated for 30 min so that the PEEK powder was uniformly dispersed in the aqueous solution.

(3) The mixed solution obtained in the step (2) was stirred intensely, 747 mL of 1.0 m/L aqueous solution of $(NH_4)_2HPO_4$ was slowly added in the mixed solution dropwise at 10 mL/min, and the pH of the mixed solution was adjusted to 10 with 10% ammonium hydroxide solution; and, the mixed solution was continuously reacted in an alkaline environment for 24 hours while intensely stirring.

(4) At last, the mixed reaction solution was vacuum filtered, and the obtained powder aggregation was washed with distilled water, vacuum dried and grinded to eventually obtain the powdery PEEK/NANO-HA composites having a NANO-HA content of 20 wt %.

Embodiment 6

(1) PEEK powdery material having a particle size of 20-70 μm was selected.

(2) 500 g of PEEK powder selected in the step (1) was added in 4.28L of 0.5 mol/L aqueous solution of $Ca(NO_3)_2 \cdot 4H_2O$ and then ultrasonically treated for 30 min so that the PEEK powder was uniformly dispersed in the aqueous solution.

(3) The mixed solution obtained in the step (2) was stirred intensely, 1.28L of 1.0 m/L aqueous solution of $(NH_4)_2HPO_4$ was slowly added in the mixed solution dropwise at 10 mL/min, and the pH of the mixed solution was adjusted to 10 with 10% ammonium hydroxide solution ; and, the mixed solution was continuously reacted in an alkaline environment for 48 hours while intensely stirring.

(4) At last, the mixed reaction solution was vacuum filtered, and the obtained powder aggregation was washed with distilled water, vacuum dried and grinded to eventually obtain the powdery PEEK/NANO-HA composites having a NANO-HA content of 30 wt %.

Embodiment 7

In the present invention, by an in-situ recombination method in water, NANO-HA was uniformly dispersed in PEEK as polymer matrix, and the obtained powdery composites have the advantages of homogeneous morphology, good interface bonding, high degree of sphericity and good fluidity, and are free of environmental pollution.

Figure 1B:
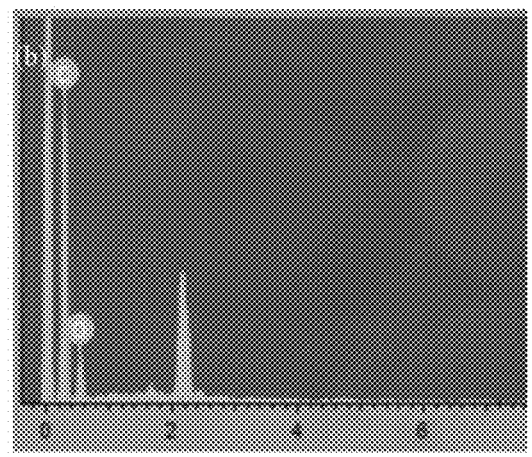
FIG. 1(b) is an EDX element analysis graph of pure PEEK powder.
Figure 2A:
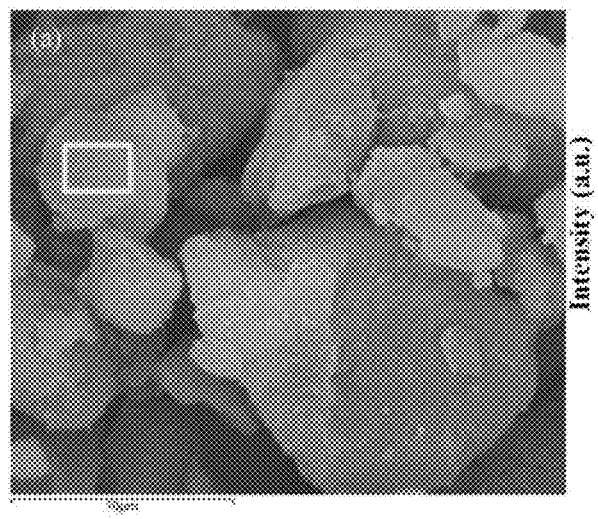
FIG. 2(a) is a micrograph of powdery PEEK/HA (20 wt %) composites in Embodiment 1.
Figure 2B:
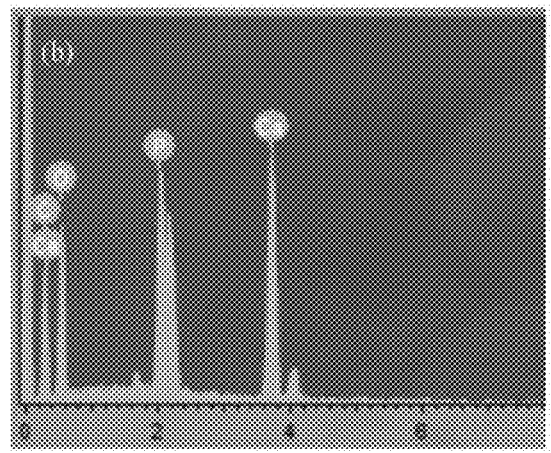
FIG. 2(b) is an EDX element analysis graph of PEEK/HA (20 wt %) in Embodiment 1.
Figure 3:
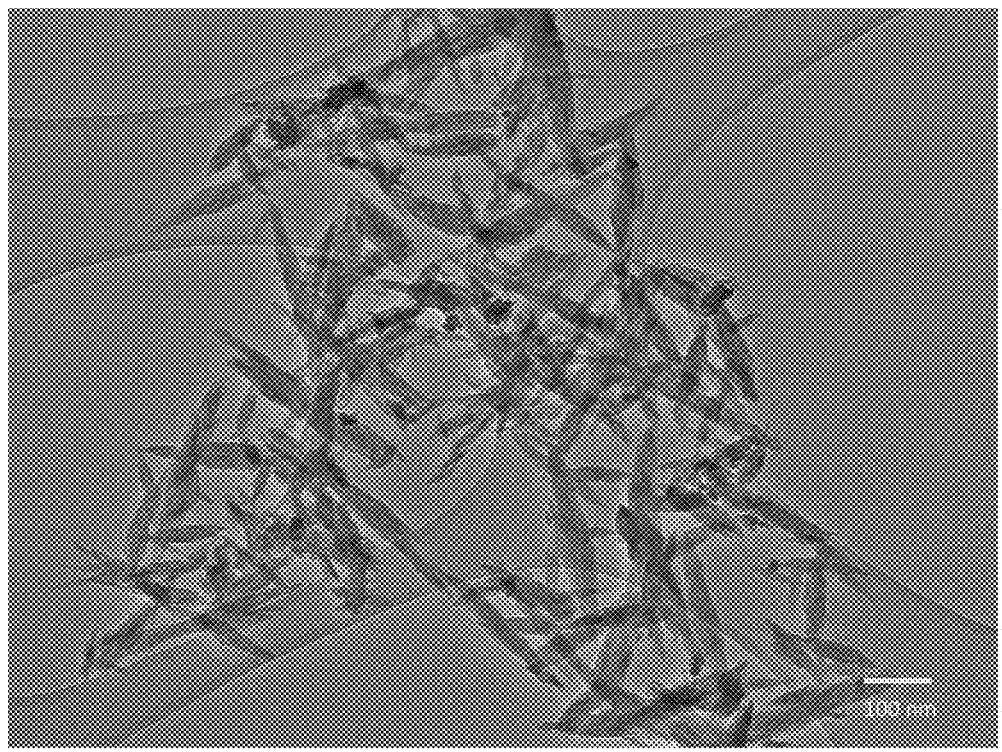
FIG. 3 is a TEM graph of NANO-HA in PEEK/HA (20 wt %) in Embodiment 1.
Figure 4:
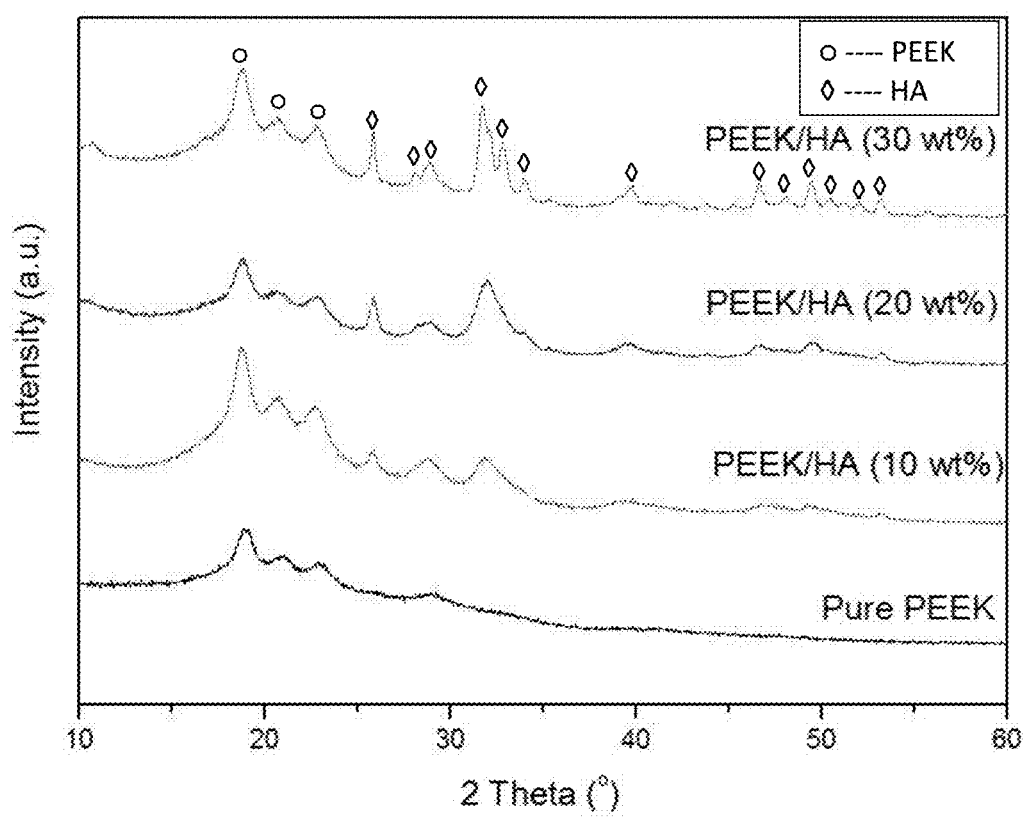
FIG. 4 is an XRD graph of pure PEEK powder and powdery PEEK/HA composites in Embodiments 1, 2 and 6.

By taking the composites in Embodiment 1 as example, the composites of the present invention are represented by various detection means. FIG. 1 shows the microstructure of pure PEEK powder and the EDX element analysis. It can be known from FIG. 1(a) that particles of the PEEK powdery material have an irregular shape and a smooth surface. EDX element analysis is performed on the white block region in FIG. 1(a), and the result of the EDX element analysis is shown in FIG. 1(b). It can be found that the powdery material is mainly composed of C and O. FIG. 2 shows the microstructure of powdery PEEK/HA (20 wt %) composites and the EDX element analysis. It can be found from the comparison of FIG. 1(a) with FIG. 2(a) that a layer of tiny particulate substance is adhered onto the surfaces of the PEEK powdery particles. EDX element analysis is performed on the white block region in FIG. 2(a), and the result of the EDX element analysis is shown in FIG. 2(b). It can be found that the powdery material is composed of C, O, P and Ca. Since the NANO-HA grows on the surfaces of the PEEK particles during the in-situ recombination process, a thin HA layer is eventually formed on the surfaces of the PEEK particles. In this way, the HA is uniformly dispersed in the PEEK matrix and the better interfacial adhesion is realized. FIG. 3 is a TEM graph of the NANO-HA prepared in Embodiment 1. It can be known that HA looks like needles and has a width of about 20 nm and a length of about 100 nm. FIG. 3 shows that the NANO-HA prepared by the present invention has good grain morphology. The needle-like HA has excellent biological activity and good quality. The HA of the present invention is moderate in size and structure, and is thus very suitable for SLS. In addition, the HA in Embodiments 2-4 looks like needles, and has a size of 30 nm*100 nm, 30 nm*150 nm and 20 nm*150 nm, respectively. FIG. 4 is an XRD graph of the pure PEEK and the powdery PEEK/HA composites prepared by the method of the present invention. It can be found that the three PEEK/HA composites have HA feature peaks at 25.9°, 31.8°, 39.8°, 46.7°, 49.5°, 53.2° and the like in the XRD spectrograms. Thus, it is indicated that HA is synthesized on the surfaces of powdery PEEK particles by chemical precipitation. The preparation method of the present invention better protects the performance of PEEK, in comparison with the pure PEEK.

It may be easily understood by those skilled in the art that the forgoing description merely shows preferred embodiments of the present invention and is not intended to limit the present invention. Any modifications, equivalent replacements or improvements made within the spirit and principle of the present invention shall fall into the protection scope of the present invention.

What is claimed is:

1. A method for preparing Polyetheretherketone/Nano-hydroxyapatite (PEEK/NANO-HA) composites for Selective Laser Sintering (SLS), comprising steps of:
   (1) selecting PEEK having a particle size of 20-70 μm;
   (2) adding the PEEK in the step 1 to an aqueous solution of a first reaction precursor so that the PEEK is uniformly dispersed in the aqueous solution to obtain a first mixed solution;
   (3) stirring the first mixed solution obtained in the step (2), dripping an aqueous solution of a second reaction precursor in the mixed solution to adjust a pH to 10-12, and reacting for 24-48 hours under stirring and obtaining a second mixed solution; and
   (4) filtering the second mixed solution in the step 3 by suction, washing, drying and grinding to eventually obtain the PEEK/NANO-HA composites;
   wherein the first reaction precursor is a precursor solution containing calcium ions; the second reaction precursor is a precursor solution containing phosphate ions; a Ca concentration in the first the reaction precursor and a P concentration in the second reaction precursor has a Ca/Pmolar ratio of 1.67-2.0; a concentration of the aqueous solution of the first reaction precursor is 0.5-1.0 mol/L, and a concentration of the aqueous solution of the second reaction precursor is 1.0-2.0 mol/L; the NANO-HA in the PEEK/NANO-HA composites has needle-like morphology, with a width of the NANO-HA of 20-30 nm and a length of the NANO-HA of 100-150 nm.

2. The preparation method according to claim 1, wherein the first reaction precursor is $Ca(OH)_2$ or $Ca(NO_3)_2$, and the second reaction precursor is $H_3PO_4$ or $(NH_4)_2HPO_4$.

3. The preparation method according to claim 2, wherein, in the step 2, the first reaction precursor is $Ca(OH)_2$, and in the step 3, the second reaction precursor is $H_3PO_4$.

4. The preparation method according to claim 2, wherein, in the step 2, the first reaction precursor is $Ca(NO_3)_2 \cdot 4H_2O$, and in the step 3, the second reaction precursor is $(NH_4)_2HPO_4$.

* * * * *